(12) United States Patent
Marginean et al.

(10) Patent No.: US 12,271,331 B2
(45) Date of Patent: Apr. 8, 2025

(54) ID-BASED TRANSACTION ROUTING FOR PCIe ENDPOINT LENDING

(71) Applicant: NXP USA, Inc., Austin, TX (US)

(72) Inventors: Alexandru Marginean, Meilen (CH); Prabhjot Singh, Noida (IN); Mohit Satsangi, New Delhi (IN); David Schuchmann, Austin, TX (US); David William Todd, Austin, TX (US); Tommi Jorma Mikael Jokinen, Austin, TX (US)

(73) Assignee: NXP USA, Inc., Austin, TX (US)

( * ) Notice: Subject to any disclaimer, the term of this patent is extended or adjusted under 35 U.S.C. 154(b) by 106 days.

(21) Appl. No.: 18/454,861

(22) Filed: Aug. 24, 2023

(65) Prior Publication Data

US 2024/0211425 A1 Jun. 27, 2024

(30) Foreign Application Priority Data

Dec. 21, 2022 (IN) .............................. 202211074318

(51) Int. Cl.
*G06F 13/40* (2006.01)
*G06F 13/42* (2006.01)

(52) U.S. Cl.
CPC ...... *G06F 13/4022* (2013.01); *G06F 13/4221* (2013.01); *G06F 2213/0026* (2013.01)

(58) Field of Classification Search
CPC ............. G06F 13/4022; G06F 13/4221; G06F 2213/0026
See application file for complete search history.

(56) References Cited

U.S. PATENT DOCUMENTS

| | | | |
|---|---|---|---|
| 7,478,178 B2 | 1/2009 | Torudbakken et al. | |
| 8,223,745 B2 | 7/2012 | Johnsen et al. | |
| 8,806,098 B1 | 8/2014 | Mandapuram et al. | |
| 10,095,645 B2 * | 10/2018 | Davis | G06F 13/105 |
| 10,810,151 B2 * | 10/2020 | Fang | G06F 13/385 |
| 10,853,271 B2 * | 12/2020 | Thomas | G06F 12/145 |
| 11,714,775 B2 * | 8/2023 | Xu | H04L 63/0428 |
| | | | 710/105 |
| 12,013,799 B2 * | 6/2024 | Tsirkin | G06F 9/30029 |

(Continued)

OTHER PUBLICATIONS

IDT datasheet, "32-Lane 8-Port PCIe Gen3 System Interconnect Switch"; IDT89H32H8G3 Product Brief; 2011; 1page.

(Continued)

*Primary Examiner* — Henry Tsai
*Assistant Examiner* — Christopher A Daley (57) ABSTRACT

A host data processing system method, apparatus, and architecture are provided for sharing a PCIe EP device with one or more lendee data processing systems in a PCIe cluster by extracting an RID value from a received PCIe transaction message corresponding to a PCIe function at the PCIe endpoint device, and then processing the RID value to identify an interconnect target port value which corresponds to a first lendee data processing system which is sharing the PCIe endpoint device, and then routing the PCIe transaction message through an interconnect on the host data processing system using an interconnect target output port corresponding to the first interconnect target port value to deliver the PCIe transaction message to the first lendee data processing system.

20 Claims, 3 Drawing Sheets

(56) References Cited

U.S. PATENT DOCUMENTS

| | | | |
|---|---|---|---|
| 2012/0284446 A1* | 11/2012 | Biran | G06F 13/36 |
| | | | 710/306 |
| 2013/0111082 A1* | 5/2013 | Baba | G06F 13/387 |
| | | | 710/38 |
| 2016/0371221 A1* | 12/2016 | Rosenberg | G06F 13/4022 |
| 2018/0101494 A1* | 4/2018 | Davis | G06F 13/105 |
| 2023/0376442 A1* | 11/2023 | Israel Vijayponraj | |
| | | | G06F 12/1027 |

OTHER PUBLICATIONS

Markussen et al. "Flexible Device Sharing in PCIe Clusters using Device Lending"; ICPP '18 Comp, Aug. 13-16, 2018, Eugene, OR, USA; 10 pages.

Microsemi, "Multi-Host Sharing of NVMe Drives and GPUs Using PCLe Fabrics", White Paper, Oct. 2019, 18 pages.

* cited by examiner

ID-BASED TRANSACTION ROUTING FOR PCIe ENDPOINT LENDING

CROSS-REFERENCE TO RELATED APPLICATIONS

This application claims priority under 35 U.S.C. § 119 to Indian Patent Application number 202211074318, filed 21 Dec. 2022, the contents of which are incorporated by reference herein.

BACKGROUND OF THE INVENTION

Field of the Invention

The present invention is directed in general to high-speed serial buses and associated methods of operation. In one aspect, the present invention relates to endpoint device lending on high-speed peripheral component interconnect express networks.

Description of the Related Art

PCI-Express (PCIe) is the backbone of today's complex systems requiring high speed data communication with high throughput, and is useful for enhancing a limited functionality system (e.g., computer processing unit or CPU) by specifying a very high-speed data communication link that can be connected to a system having the missing functionality (e.g., a graphics card, NVMe storage, etc.). Used extensively in different applications, such as computer cards, graphic cards, automotive networks, networking, industrial and consumer applications, PCIe is useful for very high-speed data applications for real-time graphics and video processing, such as required by Advanced Driver Assistance Systems (ADAS). As the challenge of scaling I/O performance of multimedia systems to meet increasing user demand, distributed systems have been developed wherein PCIe endpoint devices are connected into networked clusters so that a host computer can share or lend its endpoint functionality with remote computer(s). In such distributed systems, the routing of transactions within the lender is conventionally performed by defining address ranges for output delivery through each PCIe controller, but there are significant limitations with such address-based routing. In particular, because these address ranges are limited in size, address-based routing by a host lending computer prevents an EP device from accessing the entire address space of a lendee. This limitation is amplified if lender devices are cascaded. To make the full lendee space accessible to the EP, data exchanged by lendee software with the EP may need to be moved in the lendee space, but this results in degraded overall system performance. Other device lending solutions require adjustment of the lender device configuration and/or PCIe message packet format revisions (e.g., custom header fields in the PCIe TLP packet) based on the address map of each lendee device, but such solutions are impractical to support with generic lender devices. As seen from the foregoing, the existing PCIe device lending solutions are extremely difficult at a practical level by virtue of the challenges with providing each PCIe endpoint device with full access to the address space of the lender and lendee devices in the deployment without requiring changes in the PCIe endpoints and remote lendee device(s).

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An advanced PCI Express (PCIe) endpoint device lending method, device, system, and program code are described for performing ID-based routing of lending transactions initiated by one or more PCIe endpoint devices at a host lending computer system to one or more remote lendee computer systems. In selected embodiments, advanced PCIe EP device lending may be implemented by configuring routing logic at the host lending computer system to map requester ID (RID) values from its PCIe endpoint device(s) into network-on-chip (NoC) target port number values for the host lending computer system, thereby enabling the host lending computer system to share PCIe endpoint functionality with the one or more remote lendee computer systems without requiring any changes at the PCIe endpoint device (s) or at the remote lendee computer system(s). In selected embodiments, advanced PCIe EP device lending is enabled at the host lending computer system by configuring a lookup table to map incoming PCIe EP Function RID values to outgoing network target port number values for the network or interconnect bus at the host lending computer system. Compared to existing approaches for device lending in PCIe networks that use address-based routing of AXI transactions, the disclosed PCI Express (PCIe) endpoint device lending method removes addressing restrictions for EP transactions directed toward the lendee memory space.

Figure 1:
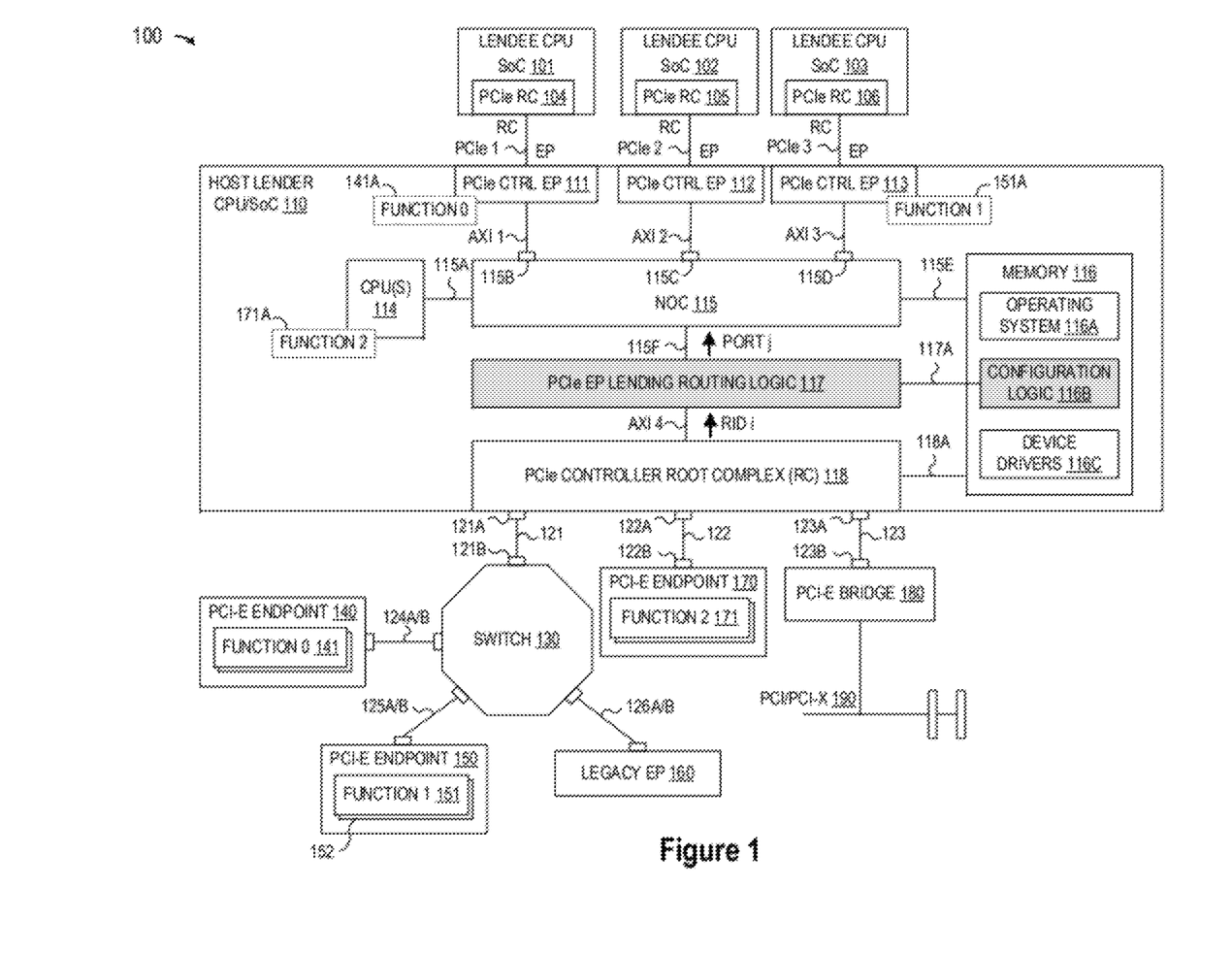
FIG. 1 is a block diagram of a PCIe communication system which provides ID-based transaction routing for endpoint device lending on high-speed peripheral component interconnect express networks in accordance with selected embodiments of the present disclosure.

To provide additional details for an improved understanding of selected embodiments of the present disclosure, reference is now made to FIG. 1 which depicts a block diagram of a PCIe communication system 100 which provides ID-based transaction routing for endpoint device lending on high-speed peripheral component interconnect express networks. As depicted, the PCIe communication system 100 includes a host lender CPU or System-on-Chip (SoC) device 110 that is connected in a PCIe network with one or more remote lendee CPU/SoC devices 101-103. In addition, the host lender CPU/SoC device 110 is connected to access any one or more of the PCIe devices 130, 140, 150, 160, 170, 180 using the PCIe switch-based serial interconnect or optionally a PCIe switch. In simple topologies, it could be a single PCIe EP device connected directly to the lender. To this end, the host lender CPU/SoC device 110 includes one or more CPUs 114 and a memory 116 that are interconnected across a network-on-chip (NoC) 115 to communicate over a root complex 118 to access any of the PCIe devices 130, 140, 150, 160, 170, 180 using the PCIe switch-based serial interconnect. As used herein, PCIe (peripheral component interconnect express) is an interface standard for connecting high-speed peripheral devices or components to a computer (also referred to as a central processing unit (CPU), a computing device, a server, a data processing system, etc.) based on a point-to-point topology. With the depicted arrangement, the CPU(s) 114 can communicate with the memory 116 via NoC 115 and busses 115A, 115E. In addition, the root complex 118 can directly access the memory 116 over the bus 118A without CPU intervention, just like DMA. In addition, the CPU 114 uses the root complex 118 to access any of the PCIe devices 130, 140, 150, 160, 170, 180 and to generate interrupts to the CPU 114 for any of the events generated by root complex 118 or the events generated by any other PCIe devices 130, 140, 150, 160, 170, 180.

In the illustrated example, the root complex 118 may include a first root port 121A for connection over the PCIe bus 121 to a switch port 121B of a switch 130, where the first root port 121A, PCIe bus 121, and switch port 121B are collectively identified as the port/bus link 121A/B. In turn, the switch 130 is connected, respectively, over PCIe port/bus links 124A/B, 125A/B, 126A/B to one or more PCIe endpoint devices 140, 150, 160. In addition, the root complex 118 may include a second root port 122A for direct connection over a PCIe bus 122 to an upstream port 122B of the PCIe endpoint device 170. The root complex 118 may also include a third root port 123A that is directly connected over a PCIe bus 123 to an upstream port 123B of the PCIe Bridge 180 to PCI/PCI-X bus 190 that provides a connection between a PCIe link and a PCI/PCI-X link. The PCIe buses 121-126 are logical connections (a.k.a., interconnects or links) which are used to connect the PCIe endpoint devices 130, 140, 150, 160, 170, 180 and to detect the status and bandwidth of each PCIe endpoint device (e.g., PCIe endpoint device 140). As used herein, a link is a point-to-point communication channel between two PCIe ports that allows both ports to send and receive PCIe requests (e.g., configuration, IO or memory read/write) and interrupts (e.g., INTx, MSI or MSI-X). At the physical level, a link is composed of one or more lanes. For example, a low-speed peripheral device (e.g., an 802.11 Wi-Fi card) uses a single-lane (x1) link, while a graphics adapter typically uses a much wider and faster 16-lane link.

In the depicted PCIe communication system 100, the CPU(s) 114 may be any suitable processing device, such as a processor, that may be programmed with software instructions and/or programming code. Thus, each CPU 114 may be embodied with one or more processors, each having one or more processor cores included therein. Each CPU 114 may represent one or more general-purpose processors such as a microprocessor, a microcontroller, or the like. For example, each CPU 114 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The CPU 114 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Connected to the CPU 114 over a memory busses 115A, 115E and NoC 115 is a memory 116 which may store programming code and/or software instructions for execution by the CPU 114. The memory 116 may include one or more volatile storage (or memory) devices such as random access memory (RAM), dynamic RAM (DRAM), synchronous DRAM (SDRAM), static RAM (SRAM), or other types of storage devices. In addition or in the alternative, the memory 116 may include non-volatile memory, such as read only memory (ROM), electrically erasable programmable ROM, flash memory, or the like. In whatever form, the memory 116 may store information including sequences of instructions that are executed by the CPU 114 or any other device. For example, executable code and/or data, in including but not limited to an operating system 116A, device drivers 116C, firmware (e.g., input output basic system or BIOS), and/or applications can be loaded in the memory 116 and executed by the CPU(s) 114. In addition and as described more fully hereinbelow, the memory 116 may also store a routing configuration logic module 116B which communicates directly with the PCIe EP lending routing logic module 117 via the bus 117A. As will be appreciated in the context of the present disclosure, the operating system (OS) 116A may be a PCIe-aware OS that includes system software to manage and control the resources in the PCIe communication system 100, including but not limited to basic input/output system (BIOS) programming and/or with host software for implementing specified PCIe functionality, such as, for example, processing interrupt requests and/or recovery loops to perform an endpoint device enumeration, restart, link restart, and/or bus rescan. In keeping with the functionality of the operating system 116A, the memory 116 may also store one or more device drivers 116C that are used to interact with the one or more PCIe devices 130, 140, 150, 160, 170, 180. Device drivers 116C may be a computer software that provides interaction with a hardware device (e.g., PCIe device 140) to an OS (e.g., operating system 116A) or other application software. For example, due to the specialized role of a device driver, device drivers are often hardware-dependent and operating system-dependent, which may be running with a kernel of the operating system.

The PCIe communication system 100 also includes a root complex 118 that is connected to the CPU(s) 114 and memory 116. Located at the uppermost layer of the tree structure of the PCIe communication system 100, the root complex 118 is connected across the NoC 115 to the CPU(s) 114 and to the memory 116. The root complex 118 includes IP registers (not shown) which are used to configure the IP. In particular, the IP registers are used to enable the clocks, to program the files, to configure the lane width (1 lane or 2 lane), and/or to configure the speed mode (gen 1 or gen2 or gen3). In addition, the IP registers in the root complex 118 are used by the CPU(s) 114 to define a configurable address space for translating addresses from CPU address space to the PCIe address space. In addition, the IP registers in the root complex 118 may be used to store incoming Requester ID (RID) transaction values received from the one or more PCIe devices 130, 140, 150, 160, 170, 180. As will be appreciated, each RID transaction value uniquely identifies a specific PCIe function and location at the one or more PCIe devices 130, 140, 150, 160, 170, 180.

Connected to the root complex 118 are a plurality of PCIe switches 130, endpoint devices 140, 150, 160, 170 and/or bridges 180. For example, the PCIe communication system 100 may include a switch 130 as a transaction layer packet (TLP) relay device between the root complex 118 and PCIe endpoint device(s) 140, 150, 160. As will be appreciated, a switch may implement a logical assembly of multiple virtual PCIe bridge devices (i.e., logical PCIe-to-PCIe bridges), such as a network switch that controls multiple point-topoint serial connections by using packet switching to receive, process, and forward data to each endpoint device (e.g., PCIe endpoint devices 140, 150, 160). For example, switch 130 may be configured to provide a fan-out from root complex 118 to links 124A/B, 125A/B, 126A/B, and to provide link scaling so that the available PCIe bus bandwidth is allocated, such that a predetermined number of links 124A/B, 125A/B, 126A/B, each having a size conforming to PCIe architecture standards, are physically routed to PCIe endpoint devices 140, 150, 160. Under the PCIe specification, each link (e.g., 124A/B) includes one or more lanes, with a link having a single lane (also referred to as having a xl width) being implemented with two low-voltage differential pairs to provide a dual simplex serial connection between two PCIe devices. In addition, the depicted PCIe communication system 100 may include a PCIe endpoint device 170 that is directly connected to the root complex 118 via PCIe bus 122A/B (e.g., without having to use switch 130). For example, if the PCIe communication system 100 is embodied as a desktop computer, the PCIe endpoint device 170 may be a graphics adapter, an NVMe storage device, or the like. Alternatively, if the PCIe communication system 100 is embodied as a server, the PCIe endpoint device 170 may be a gigabit Ethernet (GbE) and/or an additional bridge device.

To support PCIe network device lending operations, the host lender CPU/SoC device 110 may include a PCIe EP lending routing logic module 117 which is communicatively coupled between the root complex 118 and NoC 115 to control the routing of transactions initiated by one or more of the PCIe endpoint devices 140, 150, 160, 170, 180. In accordance with the PCIe industry standard for architecture-independent connection of hardware peripherals to computers, each PCIe endpoint device (e.g., 140) may provide one or more functions (e.g., Function 0 141) that is separately identifiable by a unique Requester ID (RID) triplet value that includes its bus, device, and function IDs (a.k.a., BDF).

With configuration values provided by the configuration logic module 116B, the PCIe EP lending routing logic module 117 may be configured with routing logic to map each incoming RID value (e.g., RID i) received from a PCIe endpoint device into a corresponding network target port number value (e.g., PORT j) for the NoC 115, thereby enabling the host lender CPU/SoC device 110 to share PCIe endpoint functionality with the one or more remote lendee CPU/SoC devices 101-103. In selected embodiments, advanced PCIe EP device lending is enabled at the host lender CPU/SoC device 110 by configuring the routing logic module 117 with a lookup table to map incoming PCIe EP Function RID values to outgoing network target port number values for the network or interconnect bus at the host lending computer system. In this deployment, a multi-function PCIe EP (e.g., 140) may be connected over PCIe bus (e.g., 121) to the host lender CPU/SoC device 110 which includes multiple PCIe controllers, including a PCIe controller 118 in root complex (RC) mode (that is connected to the EP(s)) and one or multiple PCIe controllers configured in EP mode 111-113 (that are connected to one or more remote lendee CPU/SoC devices 101-103). For any of the functions (e.g., Function 0 141) residing at an PCIe endpoint device (e.g. 140), the PCIe EP lending routing logic module 117 is configured to use the function's RID values to route read/write MSI/MSI-X transactions received at the PCIe controller root complex 118 toward PCIe controllers 111-113 connected to remote lendee CPU/SoC devices 101-103, or alternatively to the host lender CPU/SoC device 110 when localized routing by address is specified.

In the depicted example of FIG. 1, a first PCIe EP (e.g., 140) may include a first function (e.g., Function 0 141) that generates a read/write MSI/MSI-X transaction having a first RID value (e.g., RID a or 1:0.0). At the PCIe EP lending routing logic module 117, the first RID value RID a is processed to identify an associated outgoing network target port number value (e.g., PORT 1) for a first remote lendee device 101, such as by using a lookup table. Based on the outgoing network target port number value PORT 1, the read/write MSI/MSI-X transaction from the first function 141 is routed by the NOC 115 across the NOC port 115B (corresponding to PORT 1) and AXI bus AXI 1 to the PCIe controller in EP mode 111 which is connected over the first PCIe 1 link to RC 104 at the first remote lendee device 101. From the perspective of the first remote lendee device 101, the first function (e.g., Function 0 141) is seen as the first function (e.g., Function 0 141A) being presented by the PCIe controller in EP mode 111 without seeing the underlying topology. In similar fashion, a second function (e.g., Function 1 151) from a second PCIe EP (e.g., 150) may have a read/write MSI/MSI-X transaction with a second RID value (e.g., RID b or 2:0.0) that is routed by the PCIe EP lending routing logic module 117 to an associated outgoing network target port number value (e.g., PORT 2) for a second remote lendee device 103. Based on the outgoing network target port number value PORT 2, the read/write MSI/MSI-X transaction from the second function 151 would be routed by the NOC 115 across the NOC port 115D (corresponding to PORT 2) and AXI bus AXI 3 to the PCIe controller in EP mode 113 which is connected over the second PCIe 3 link to RC 106 at the second remote lendee device 103 where it would appear, from the perspective of the second remote lendee device 103 as the second function (e.g., Function 1 151A) being presented by the PCIe controller in EP mode 113 without seeing the underlying topology.

As will be appreciated, there may be situations where a PCIe EP function is to be processed by the host lender CPU/SoC device 110, in which case the PCIe EP lending routing logic module 117 routes the associated read/write MSI/MSI-X transaction to the host lender CPU/SoC device 110 for processing. For example, a PCIe EP (e.g., 150) may have a third function (e.g., Function 2 152) which issues a read/write MSI/MSI-X transaction with a third RID value (e.g., RID c or 2:0.2) that is routed by the PCIe EP lending routing logic module 117 to a default network target port value (e.g., DEF) that is reserved for routing-by-address at the host lender CPU/SoC device 110. Based on the default network target port value DEF, the read/write MSI/MSI-X transaction from the third function 152 would be routed by the NOC 115 across the AXI bus 115A to the CPU(s) 114 for processing as the third function (e.g., Function 2 152).

Though illustrated as being located in between the root complex 118 and NoC 115, the PCIe EP lending routing logic module 117 may have its functionality distributed across either or both of the root complex 118 and NoC 115. By confining the computational functionality of the PCIe EP lending routing logic module 117 to the host lender CPU/SoC device 110, RID-based transaction routing support for device lending can be implemented without requiring changes to the PCIe endpoint devices 130, 140, 150, 160, 170, 180 so that it can be used with generic EPs (e.g., NVMe, graphics accelerators, PCIe to Eth adapters, etc.). In addition, the execution of the PCIe EP lending routing logic module 117 functionality at the host lender CPU/SoC device 110 means that no changes area required at the remote lendee CPU/SoC devices 101-103, so existing computer systems/SoCs can be used. As a result of using lookup table operations to derive side-band information from the PCIe EP Function RID values, transaction routing in the lender system does not require complex emulation techniques or any adjustment or modification of PCIe message packet formats.

As will be appreciated, the PCIe communication system 100 may be implemented with one or more data processing systems, such as a personal computer system, server, workstation, network storage device, embedded system, or any other suitable computer system. Generally speaking, a "data processing system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. As such, the data processing system may include random access memory (RAM), one or more processing resources (such as a CPU, hardware or software control logic), read only memory (ROM), and/or other types of memory. Additional components of the data processing system may include one or more disk drives, one or more network ports for communicating with external devices, as well as various input and output (I/O) devices, such as a keyboard, a mouse, and a video display. The data processing system may also include one or more buses operable to transmit communications between the various hardware components.

Figure 2:
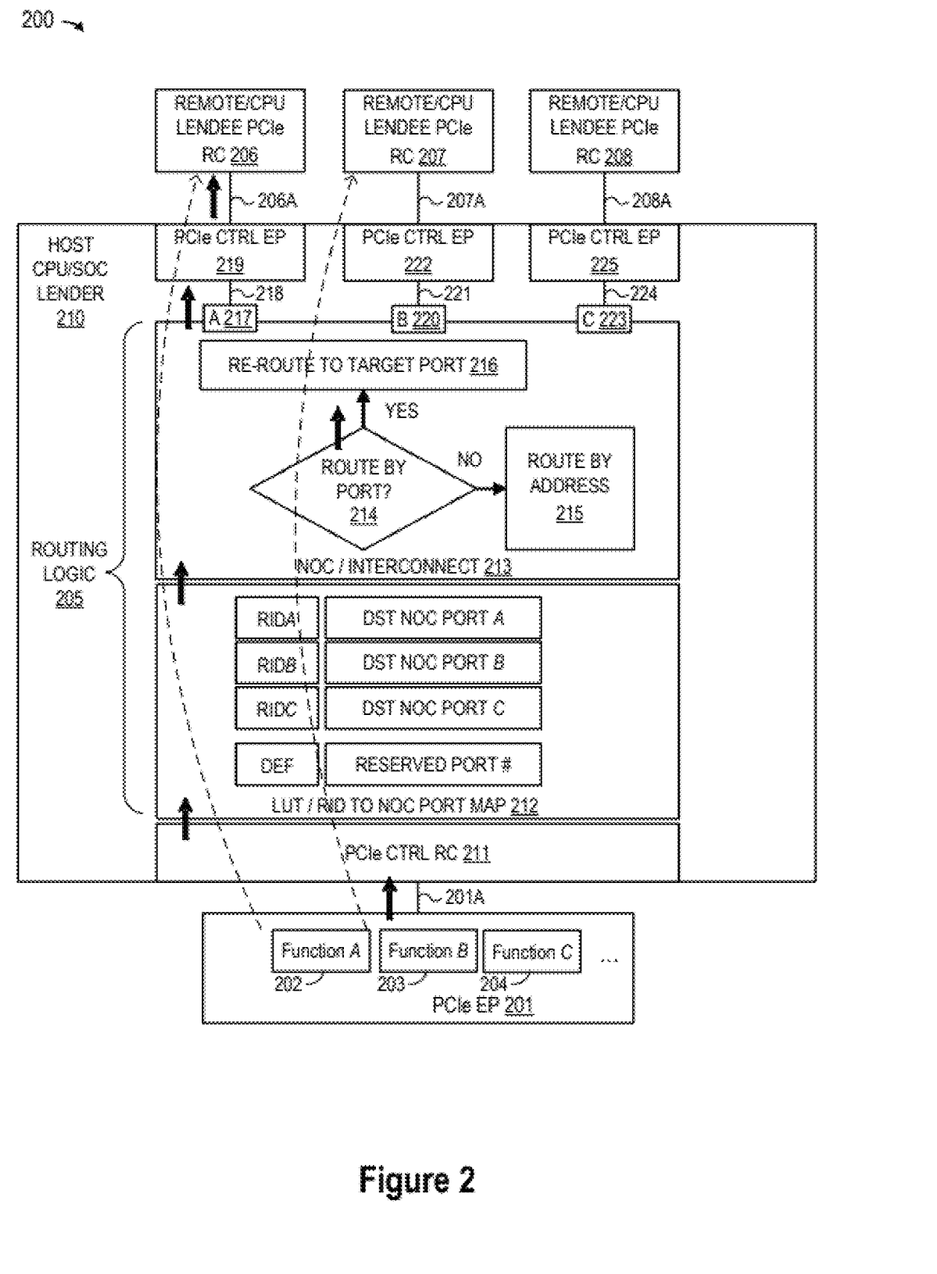
FIG. 2 is a simplified block diagram illustration of the routing logic at a lending computer device which uses a lookup table to map incoming Requester ID (RID) transaction values initiated by a PCIe endpoint device to one or more designated network-on-chip (NoC) ports in accordance with selected embodiments of the present disclosure.

To provide additional details for an improved understanding of selected embodiments of the present disclosure, reference is now made to FIG. 2 which depicts a simplified block diagram 200 of a host lending computer device 210 which is connected to a PCIe endpoint device 201 to share or lend one or more PCIe functions 202-204 with one or more remote lendee computer devices 206-208. To enable lending of the PCIe EP 201, the host lending computer device 210 includes routing logic 205 which maps incoming Requester ID (RID) transaction values initiated by a PCIe endpoint device 201 to one or more designated network ports 217, 220, 223 of a network-on-chip (NoC) or interconnect 213. In this example, the PCIe endpoint device 201 includes a plurality of PCIe functions 202-204 that may be shared by the host lending computer device 210 and a plurality of remote lendee computer devices 206-208. For any PCIe function (e.g., Function A 202), the PCIe EP 201 issues a read/write transaction and associated RID value that is transmitted over the PCIe link 201A to the host lending computer device 210.

At the host lending computer device 210, the PCIe controller RC 211 is connected to receive read/write transactions from the PCIe function(s) 202-204 and to transform each received read/write transaction into an AXI transaction. The host lending computer device 210 also includes a routing logic 205 which routes received AXI transactions over the NOC/interconnect 213 to designated target ports on behalf of the shared PCIe function (e.g., 202) based on side-band information derived from the PCIe EP Function RID. To derive the side-band information, the routing logic 205 may include a PCIe RID-to-NOC port map 212 which maps each incoming RID value from an AXI transaction into a corresponding destination NOC port number (e.g., DST NOC PORT A, DST NOC PORT B, DST NOC PORT C, etc.) or to a default network target port value (e.g., DEF), depending on the configuration of the PCIe RID-to-NOC port map 212. In selected embodiments, the PCIe RID-to-NOC port map 212 may be implemented with a lookup table which is connected to receive incoming RID values and to generate outgoing network target port number values for the NOC/interconnect 213. Extended routing logic 205 is also embodied in the NOC/interconnect 213 to process all transactions marked with a valid target port number for direct routing to the respective port. For example, the extended control logic 205 may determine whether an AXI transaction is to be routed by port (step 214) by detecting if the transaction is marked with a valid destination or target NOC port number derived from the lookup table 212. If so (affirmative outcome to detection step 214), then each transaction marked with a valid destination NOC port number is re-routed directly to the respective NOC/interconnect port (step 216). For example, if an incoming 16 bit PCIe RID value for a PCIe function (e.g., Function A 202) is processed by the routing logic 205 to identify a target NOC routing port (e.g., port A 217), then the associated AXI transaction for Function A 202 is directly routed by the NOC 213 over the target NOC routing port 217 and AXI bus 217 to the PCIe EP controller 219 which is connected over the PCIe link 206A to the remote/CPU lendee PCIe RC 206. In similar fashion, if the routing logic 205 processes incoming 16 bit PCIe RID values for other PCIe functions (e.g., Function B 203) to identify corresponding target NOC routing ports (e.g., port B 220), the associated AXI transaction is directly routed by the NOC 213 over the target NOC routing port 220, AXI bus 221, PCIe EP controller 222, and PCIe link 207A to the remote/CPU lendee PCIe RC 207. Likewise, if the routing logic 205 processes incoming 16 bit PCIe RID values for another PCIe function (e.g., Function C 204) to identify a corresponding target NOC routing port (e.g., port C 223), the associated AXI transaction is directly routed by the NOC 213 over the target NOC routing port 223, AXI bus 224, PCIe EP controller 225, and PCIe link 208A to the remote/CPU lendee PCIe RC 208. With such re-routed transactions, the transaction address is ignored for these transactions as they are allocated from the space of a remote lendee computer device 206-208, not the host lending computer device 210.

However, there will be applications where the PCIe EP function is to be processed by the host lender CPU/SoC device 210, in which case the routing logic 205 routes the associated AXI transaction to the host lender CPU/SoC device 210 for processing. In such cases, the routing logic 205 may determines that an AXI transaction is not marked with a valid destination NOC port number or is marked with a default NOC port number (negative outcome to detection step 214). In this case, the transaction is routed by address (step 215) so that it is terminated in the host lending computer device 210.

By using the lookup table 212 to identify target port number values from the incoming RID values or a reserved target port number for lookup table misses, the routing logic 205 does not need to modify the AXI transaction address format, but instead uses the target or default target port number values as sideband information to route the transaction through the NOC/interconnect 213. Compared to device lending support in conventional SoCs/processors that use address-based routing of AXI transactions, the disclosed routing logic 205 removes addressing restrictions for EP transactions toward lendee space. In addition, the disclosed routing logic 205 does not require address translation, such as used with Non-Transparent Bridge (NTB) based solutions, which can adversely affect the EP programming model and require software changes on remote lendee devices.

As disclosed herein, the routing logic 205 may be implemented with a hardware and/or software components of host CPU/SoC lender device 210 which is connected in a PCIe communication system to share PCIe endpoint functionality 202-204 amongst one or more remote CPU/SoC lendee PCIe devices 206-208. For example, the hardware system components at the lender device 210 may include a host CPU, a NOC or interconnect 213, lookup table 212, root complex hardware controller 211, and one or more PCIe EP hardware controllers 219, 222, 225. In addition, the root complex hardware controller 211 is connected over a first PCIe bus 201A to a first endpoint device 210, and is also connected over an internal bus (e.g., AXI bus) to the lookup table 212. In turn, the lookup table 212 is connected to the NOC or interconnect 213 which has NOC output ports 217, 220, 223 connected respectively to PCIe EP hardware controllers 219, 222, 225. In addition to hardware components, the host CPU/SoC lender device 210 may include software system components, such as a host driver and endpoint driver which are stored in memory and executed by the host CPU. In operation, the host CPU and software drivers are communicatively coupled to exchange data and/or instructions and to control the endpoint devices (e.g., 201) with configuration data. In addition, the host CPU/SoC lender device 210 may include a routing configuration logic software which communicates directly with the lookup table 212 to specify a destination NOC port number (e.g., DST NOC PORT A, DST NOC PORT B. DST NOC PORT C, etc.) for each incoming RID value.

Figure 3:
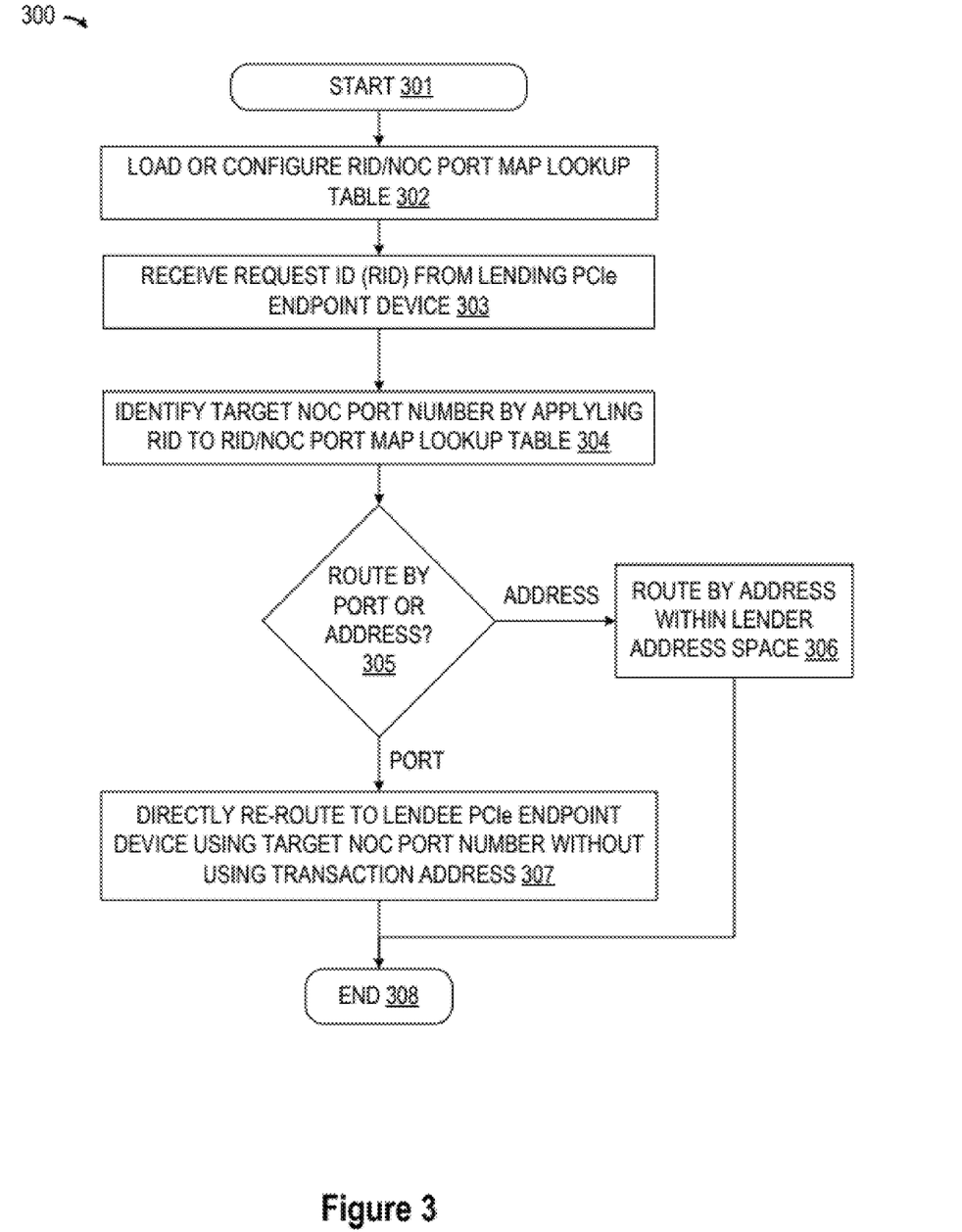
FIG. 3 depicts a simplified flow chart showing the logic for a lender computer system to route PCIe EP transactions to one or more lendee computer systems based on PCIe EP function RID values in accordance with selected embodiments of the present disclosure.

To provide additional details for an improved understanding of selected embodiments of the present disclosure, reference is now made to FIG. 3 which depicts a simplified flow chart 300 showing the logic for a lender computer system to route PCIe EP transactions to one or more lendee computer systems based on PCIe EP function RID values. In an example embodiment, the control logic and methodology shown in FIG. 3 may be implemented as hardware and/or software on a host or lending computing system that includes processor and memory for storing programming control code for controlling the operation of one or more PCIe endpoint devices connected to a root complex device.

The process starts (step 301) at the PCIe system before, during, or after the host CPU/SoC lender device begins the enumeration process of detecting which endpoint devices are connected to the host CPU/SoC lender device. In particular, a first or preliminary step would be for the host CPU/SoC lender device to load or configure an RID-to-NOC port map lookup table (step 302). In selected embodiments, the host CPU/SoC lender device may include executable configuration code and/or data that is loaded from memory and executed by the CPU(s) to configure the RID-to-NOC port map lookup table or other suitable routing logic module. With such a lookup table, a plurality of PCIe EP Function RID values are mapped to a corresponding plurality of outgoing network target port number values for the network or interconnect bus at the host CPU/SoC lender device (e.g., RID 1→Port 1, RID 2→Port 2, RID 3→Port 3, etc.). In addition, the lookup table may map a default input value (e.g., RID 0 or DEF) to a reserved port number (e.g., DEF→Reserved Port Number) to account for situations where transactions are routed by address so that they are terminated at the host CPU/SoC lender device.

At step 303, the host CPU/SoC lender device receives a Requester ID (RID) from the lending PCIe endpoint device, where the RID transaction value uniquely identifies a specific PCIe function and location of the lending PCIe endpoint device. In an example embodiment, the host CPU/SoC lender device includes a PCIe root complex controller which is connected to receive read/write transactions from a PCIe function which include source and destination address information along with data, such as the RID transaction value which is transformed into an AXI transaction.

At step 304, the host CPU/SoC lender device identifies a target NOC port number by applying the received RID transaction value to the RID-to-NOC port map lookup table. In operation, each incoming RID transaction value (e.g., RID i) received from a PCIe endpoint device may be mapped into a corresponding network target port number value (e.g., PORT j) for the connected NOC or interconnect, thereby enabling the host CPU/SoC lender device to re-route PCIe endpoint functionality transactions to a network target port associated with a destination remote lendee CPU/SoC device or, alternatively, to the host CPU/SoC lender device.

At step 305, the host CPU/SoC lender device determines if the PCIe endpoint functionality transaction is to be routed by "PORT" or by "ADDRESS." If the processing at step 305 identifies a target NOC port number from the received RID transaction value ("PORT" outcome from detection step 305), then the host CPU/SoC lender device directly re-routes the PCIe endpoint functionality transaction from the lendee PCIe endpoint device through the NOC/interconnect using the target NOC port number without using the transaction address (step 307). However, if the processing at step 305 does not identify a target NOC port number from the received RID transaction value ("ADDRESS" outcome from detection step 305), then the host CPU/SoC lender device routes the PCIe endpoint functionality transaction from the lendee PCIe endpoint device by address within the lender address space (step 306).

At step 308, the process ends or alternatively returns to the step 308 for reception and processing of additional RID transaction values.

By now it should be appreciated that there has been provided a computer-implemented method, architecture, circuit, and system for sharing a peripheral component interconnect express (PCIe) endpoint device with one or more lendee data processing systems in a PCIe cluster. In the disclosed methodology, a host data processing system receives a first PCIe transaction message that is generated by a first PCIe endpoint device connected to the host data processing system. In addition, the host data processing system extracts a first Requester ID (RID) transaction value from the first PCIe transaction message corresponding to a PCIe function at the first PCIe endpoint device. The host data processing system also processes the first RID transaction value to identify a first interconnect target port value which corresponds to a first lendee data processing system which is sharing the first PCIe endpoint device. In selected embodiments, the host data processing system processes the first RID transaction value by mapping the first RID transaction value to the first interconnect target port value. In such embodiments, the first RID transaction value is mapped to the first interconnect target port value by applying the first RID transaction value to a lookup table which outputs the first interconnect target port value in response to the first RID transaction value. Subsequently, the host data processing system routes the first PCIe transaction message through an interconnect on the host data processing system using an interconnect target output port corresponding to the first interconnect target port value to deliver the first PCIe transaction message to the first lendee data processing system. In selected embodiments, the host data processing system also programs routing logic with configuration values to associate a plurality of RID transaction values with a corresponding plurality of interconnect target port values. In selected embodiments, the host data processing system is the first lendee data processing system such that the first interconnect target port value corresponds to the host data processing system. In other selected embodiments, the first lendee data processing system is a remote data processing system connected to the host data processing system over a PCIe link such that the first interconnect target port value corresponds to the remote data processing system. In selected embodiments, routing the first PCIe transaction message through the interconnect on the host data processing system does not employ address-based routing. In other embodiments, routing the first PCIe transaction message through the interconnect on the host data processing system does not require customizing the first lendee data processing system or address translation for the first PCIe transaction message.

In another form, there is provided a host processing system for sharing a peripheral component interconnect express (PCIe) endpoint device with one or more lendee data processing systems in a PCIe cluster. The disclosed host processing system includes at least one processing device configured to execute a host operating system (OS), a first memory coupled to the processing device, and a network-on-chip (NoC) interconnect operatively coupled to the processing device and configured for data communication between one or more endpoint devices and one or more lendee data processing systems. The disclosed host processing system is configured to perform a specified sequence of steps. In particular, the host processing system is configured to receive a first PCIe transaction message that is generated by a first PCIe endpoint device connected to the host processing system. In addition, the host processing system is configured to extract a first Requester ID (RID) transaction value from the first PCIe transaction message corresponding to a PCIe function at the first PCIe endpoint device. The host processing system is also configured to process the first RID transaction value to identify a first NoC interconnect target port value which corresponds to a first lendee data processing system which is sharing the first PCIe endpoint device. In addition, the host processing system is configured to route the first PCIe transaction message through the NoC interconnect using an interconnect target output port corresponding to the first NoC interconnect target port value to deliver the first PCIe transaction message to the first lendee data processing system. In selected embodiments, the host processing system includes routing logic programmed with configuration values to associate a plurality of RID transaction values with a corresponding plurality of NoC interconnect target port value. In other selected embodiments, the host processing system is configured to process the first RID transaction value by mapping the first RID transaction value to the first NoC interconnect target port value. In such embodiments, the host processing system may be configured to map the first RID transaction value by applying the first RID transaction value to a lookup table which outputs the first NoC interconnect target port value in response to the first RID transaction value. In selected embodiments, the host processing system is the first lendee data processing system such that the first NoC interconnect target port value corresponds to the host data processing system. In other selected embodiments, the first lendee data processing system is a remote data processing system connected to the host processing system over a PCIe link such that the first NoC interconnect target port value corresponds to the remote data processing system. In selected embodiments, the host processing system is configured to route the first PCIe transaction message through the NoC interconnect without using address-based routing. In other embodiments, the host processing system is configured to route the first PCIe transaction message through the NoC interconnect without customizing the first lendee data processing system or address translation for the first PCIe transaction message.

In yet another form, a processing system is provided which includes logic instructions on a non-transitory storage medium. In selected embodiments, the logic instructions may be implemented as a computer program product which is embodied as a non-transitory machine-readable medium having instructions stored therein for execution by a processor to share a peripheral component interconnect express (PCIe) endpoint device with one or more lendee data processing systems in a PCIe cluster. As disclosed, the logic instructions may embody software that is configured for execution by a processor to enable the processing system to receive a first PCIe transaction message that is generated by a first PCIe endpoint device connected to the host data processing. In addition, the logic instructions or software that is configured for execution by a processor to enable the processing system to extract a first Requester ID (RID) transaction value from the first PCIe transaction message corresponding to a PCIe function at the first PCIe endpoint device. In addition, the logic instructions or software that is configured for execution by a processor to enable the processing system to process the first RID transaction value to identify a first interconnect target port value which corresponds to a first lendee data processing system which is sharing the first PCIe endpoint device. In selected embodiments, the logic instructions may be configured to process the first RID transaction value by mapping the first RID transaction value to the first interconnect target port value. In such embodiments, the logic instructions may be configured to map the first RID transaction value by applying the first RID transaction value to a lookup table which outputs the first interconnect target port value in response to the first RID transaction value. In addition, the logic instructions or software that is configured for execution by a processor to enable the processing system to route the first PCIe transaction message through an interconnect on the host data processing system using an interconnect target output port corresponding to the first interconnect target port value to deliver the first PCIe transaction message to the first lendee data processing system. In addition, the logic instructions may be configured to program routing logic with configuration values to associate a plurality of RID transaction values with a corresponding plurality of interconnect target port values.

Although the described exemplary embodiments disclosed herein focus on example PCIe host lender devices, systems, and methods for using same to implement RID-based transaction routing to support EP lending, the present invention is not necessarily limited to the example embodiments illustrate herein. For example, various embodiments of providing ID-based transaction routing for PCIe EP lending may be applied in any suitable data processing system application, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method for sharing a peripheral component interconnect express (PCIe) endpoint device with one or more lendee data processing systems in a PCIe cluster, comprising:
   receiving, by a host data processing system, a first PCIe transaction message that is generated by a first PCIe endpoint device connected to the host data processing system;
   extracting, by the host data processing system, a first Requester ID (RID) transaction value from the first PCIe transaction message corresponding to a PCIe function at the first PCIe endpoint device;
   processing, by the host data processing system, the first RID transaction value to identify a first interconnect target port value which corresponds to a first lendee data processing system which is sharing the first PCIe endpoint device; and
   routing the first PCIe transaction message through an interconnect on the host data processing system using an interconnect target output port corresponding to the first interconnect target port value to deliver the first PCIe transaction message to the first lendee data processing system.

2. The computer-implemented method of claim 1, further comprising programming, at the host data processing system, routing logic with configuration values to associate a plurality of RID transaction values with a corresponding plurality of interconnect target port values.

3. The computer-implemented method of claim 1, where processing the first RID transaction value comprises mapping the first RID transaction value to the first interconnect target port value.

4. The computer-implemented method of claim 3, where mapping the first RID transaction value comprises applying the first RID transaction value to a lookup table which outputs the first interconnect target port value in response to the first RID transaction value.

5. The computer-implemented method of claim 1, where the host data processing system is the first lendee data processing system such that the first interconnect target port value corresponds to the host data processing system.

6. The computer-implemented method of claim 1, where the first lendee data processing system is a remote data processing system connected to the host data processing system over a PCIe link such that the first interconnect target port value corresponds to the remote data processing system.

7. The computer-implemented method of claim 1, where routing the first PCIe transaction message through the interconnect on the host data processing system does not employ address-based routing.

8. The computer-implemented method of claim 1, where routing the first PCIe transaction message through the interconnect on the host data processing system does not require customizing the first lendee data processing system or address translation for the first PCIe transaction message.

9. A host data processing system for sharing a peripheral component interconnect express (PCIe) endpoint device with one or more lendee data processing devices in a PCIe cluster, the host data processing system comprising:
   at least one processing device configured to execute a host operating system (OS);
   a first memory coupled to the processing device; and
   a network-on-chip (NoC) interconnect operatively coupled to the processing device and configured for data communication between one or more endpoint devices and one or more lendee data processing systems;
   where the host data processing system is configured to:
   receive a first PCIe transaction message that is generated by a first PCIe endpoint device connected to the host data processing system;
   extract a first Requester ID (RID) transaction value from the first PCIe transaction message corresponding to a PCIe function at the first PCIe endpoint device;
   process the first RID transaction value to identify a first NoC interconnect target port value which corresponds to a first lendee data processing system which is sharing the first PCIe endpoint device; and
   route the first PCIe transaction message through the NoC interconnect using an interconnect target output port corresponding to the first NoC interconnect target port value to deliver the first PCIe transaction message to the first lendee data processing system.

10. The host data processing system of claim 9, where the host data processing system comprises routing logic programmed with configuration values to associate a plurality of RID transaction values with a corresponding plurality of NoC interconnect target port values.

11. The host data processing system of claim 9, where the host data processing system is configured to process the first RID transaction value by mapping the first RID transaction value to the first NoC interconnect target port value.

12. The host data processing system of claim 11, where the host data processing system is configured to map the first RID transaction value by applying the first RID transaction value to a lookup table which outputs the first NoC interconnect target port value in response to the first RID transaction value.

13. The host data processing system of claim 9, where the host data processing system is the first lendee data processing system such that the first NoC interconnect target port value corresponds to the host data processing system.

14. The host data processing system of claim 9, where the first lendee data processing system is a remote data processing system connected to the host data processing system over a PCIe link such that the first NoC interconnect target port value corresponds to the remote data processing system.

15. The host data processing system of claim 9, where the host data processing system is configured to route the first PCIe transaction message through the NoC interconnect without using address-based routing.

16. The host data processing system of claim 9, where the host data processing system is configured to route the first PCIe transaction message through the NoC interconnect without customizing the first lendee data processing system or address translation for the first PCIe transaction message.

17. A processing system, comprising:

logic instructions on a non-transitory storage medium configured to:

receive a first PCIe transaction message that is generated by a first PCIe endpoint device connected to the host data processing system;

extract a first Requester ID (RID) transaction value from the first PCIe transaction message corresponding to a PCIe function at the first PCIe endpoint device;

process the first RID transaction value to identify a first interconnect target port value which corresponds to a first lendee data processing system which is sharing the first PCIe endpoint device; and route the first PCIe transaction message through an interconnect on the host data processing system using an interconnect target output port corresponding to the first interconnect target port value to deliver the first PCIe transaction message to the first lendee data processing system.

18. The processing system of claim 17, where the logic instructions are configured to program routing logic with configuration values to associate a plurality of RID transaction values with a corresponding plurality of interconnect target port values.

19. The processing system of claim 17, where the logic instructions are configured to process the first RID transaction value by mapping the first RID transaction value to the first interconnect target port value.

20. The processing system of claim 19, where the logic instructions are configured to map the first RID transaction value by applying the first RID transaction value to a lookup table which outputs the first interconnect target port value in response to the first RID transaction value.

* * * * *